J. CORBEIL.
Potato-Bug Collectors.
No. 134,854.            Patented Jan. 14, 1873.
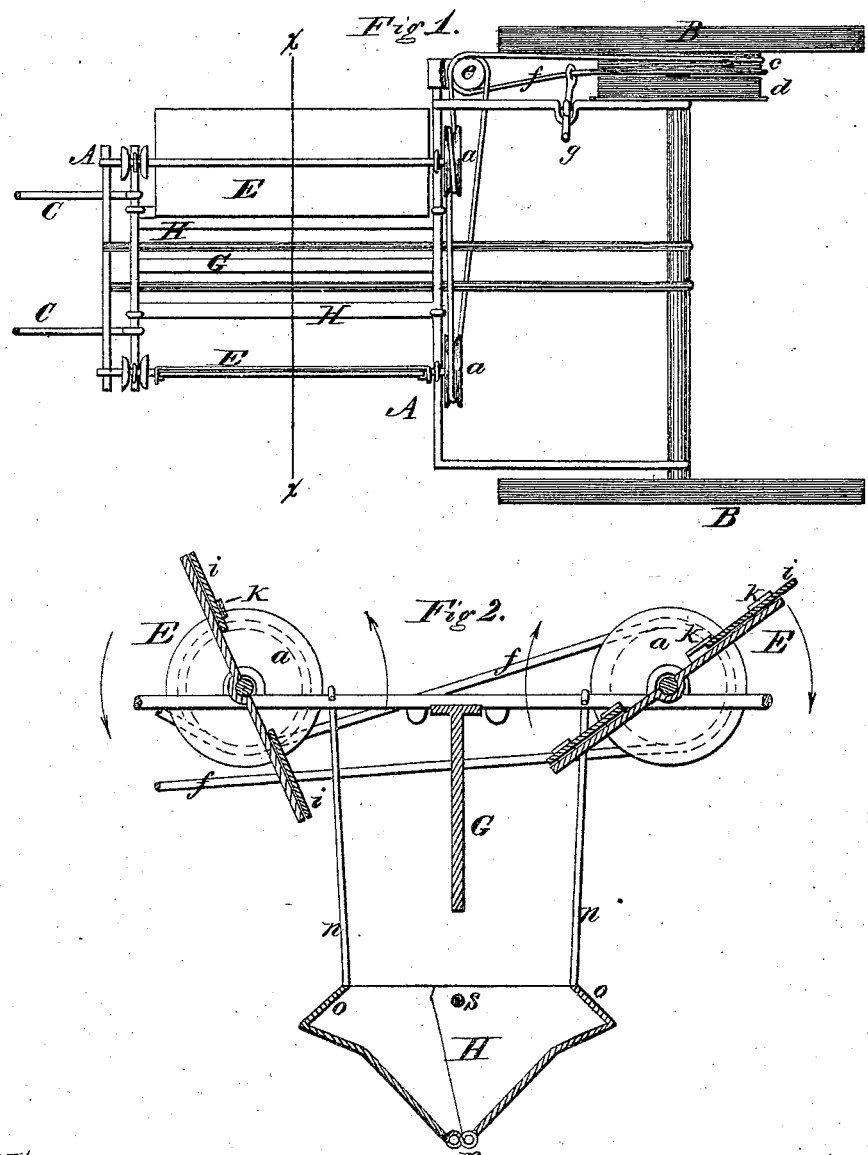

UNITED STATES PATENT OFFICE.

JOSEPH CORBEIL, OF LIND, WISCONSIN.

IMPROVEMENT IN POTATO-BUG COLLECTORS.

Specification forming part of Letters Patent No. 134,854, dated January 14, 1873.

*To all whom it may concern:*

Be it known that I, JOSEPH CORBEIL, of Lind, in the county of Waupaca and State of Wisconsin, have invented certain Improvements in Machines for Removing Insects from Potato Vines, &c., of which the following is a specification, reference being had to the accompanying drawing.

My invention consists in certain improvements in the machine for which Letters Patent were granted to me on the 28th day of July, 1868, No. 80,458, as hereinafter fully described.

Figure 1 is a top-plan view of my improved machine; and Fig. 2, a vertical cross-section of the same on the line $x\ x$ of Fig. 1.

In constructing my machine I provide a frame, A, and attach to its rear end two large supporting-wheels, B, and to its forward end a pair of thills or shafts, C, for attaching a horse, which both draws the machine and supports its forward end. In the sides of the frame I mount two longitudinal rotating beaters, E E, and to the shaft of each beater secure a pulley, $a$, as shown. By the side of one of the wheels B I mount two pulleys, $c$ and $d$, the former secured to the wheel so as to turn with it, and the latter loose so as to turn independently; and in the corner of the frame I mount a vertical roller, $e$, as shown. I then provide a belt, $f$, and pass it around the pulley $c$, the roller $e$, and the pulleys $a$ of the beaters, in the manner shown, so that when the machine is drawn forward the two beaters or fans are rapidly revolved in the directions indicated by the arrows in Fig. 2, so that their lower edges sweep inward toward each other. To one side of the frame I pivot a hand-lever, $g$, provided in its lower end with an eye, through which the belt $f$ runs, as shown in Fig. 1, so that by moving the lever the belt may be shifted onto the loose pulley $d$, so as to stop the motion of the beaters. Under the middle of the frame I suspend, by rods $n$, a V-shaped trough, H, to receive the bugs as they are knocked off from the vines by the beaters. The trough is suspended just clear of the ground, so as to run in the furrows between the rows of vines, and is made of such width as to extend under the vines close to their stalks. To prevent the bugs from crawling out of the trough it is provided with an inwardly-projecting flange, $o$, along each side, as shown in Fig. 2. As the spaces between the rows of vines will be different in one field from those in another, the trough is made in two parts, hinged together in the middle, as shown in Fig. 2, so that its width may be varied as circumstances require. To prevent the beaters from throwing the bugs over past the opposite side of the trough, a vertical plate, G, is suspended to the under side of the frame, over the middle of the trough or receptacle, so that the bugs will strike against the plate and fall into the trough. As the beaters or fans are not adjustable in height, it follows that blades of proper length to operate on tall or large vines will be too short to reach young small vines. To obviate this difficulty, I provide the blades of the beaters with sliding plates $i$, held by lugs $k$, so that by sliding the plates in or out the diameter or size of the beaters may be varied, as required.

The machine thus constructed is used in the same manner as the one already patented to me, by driving it through the potato-field between the rows of vines, so that the beaters whipping rapidly against their tops knock the bugs off into the trough, from which they are afterward removed and destroyed. The main points of difference between the present machine and the old one are in the method of driving the beaters, in providing the beaters with the extensible blades, in making the trough or receptacle adjustable, and in providing the beaters with the adjustable blades or wings. The use of the belt to drive the beaters, and its peculiar arrangement so that it operates both beaters and requires the use of but one driving-pulley, $c$, enables me to construct my improved machine at much less cost than when gearing is used for the purpose, as in my old machine.

By my various improvements I overcome the objections incident to my old machine and render it perfect in its operation, and also, as before stated, reduce the cost of its construction.

Having thus described my invention, what I claim is—

1. The combination of the revolving beaters E, the V-shaped trough H, and the vertical plate G, when constructed and arranged to operate as set forth.

2. The rotary beaters E having their blades provided with the adjustable plates $i$, whereby they are adapted for operating upon vines of different heights.

3. In combination with the beaters E, the adjustable trough or receptacle, constructed substantially as described, so that its width may be varied, as required.

4. The combination of the rotary beaters E, provided with pulleys $a$, the roller $e$, and the driving-pulley $c$ with the belt $f$, when arranged as described, so that it revolves the two beaters in opposite directions, as set forth.

JOSEPH CORBEIL.

Witnesses:
ED. SELLECK,
OLE R. OLSON.